United States Patent [19]

Frisken

[11] Patent Number: 5,508,845
[45] Date of Patent: Apr. 16, 1996

[54] QUASI-SOLITON COMMUNICATION SYSTEM

[75] Inventor: Steven J. Frisken, Coogee, Australia

[73] Assignee: Telstra Corporation Limited, Sydney, Australia

[21] Appl. No.: 439,096

[22] Filed: May 11, 1995

Related U.S. Application Data

[63] Continuation of Ser. No. 39,016, Apr. 7, 1993, abandoned.

[30] Foreign Application Priority Data

Oct. 18, 1990 [AU] Australia .................... PK2887

[51] Int. Cl.⁶ ............................................ H04B 10/00
[52] U.S. Cl. ........................... 359/161; 359/179; 359/184
[58] Field of Search ............................ 359/154, 157, 359/160, 174, 173, 176, 180, 184, 185, 166, 161

[56] References Cited

U.S. PATENT DOCUMENTS

| | | | |
|---|---|---|---|
| 4,428,007 | 1/1984 | Tanaka et al. | 360/44 |
| 4,609,951 | 9/1986 | Aruga | 360/46 |
| 4,617,553 | 10/1986 | Webster et al. | 340/347 |
| 4,700,339 | 10/1987 | Gordon et al. | 359/188 |
| 4,741,587 | 5/1988 | Jewell et al. | 359/188 |
| 4,747,113 | 5/1988 | Viallevieille | 375/25 |
| 4,833,680 | 5/1989 | Kaiser et al. | 372/29 |
| 4,912,716 | 3/1990 | Mead | 372/32 |
| 4,928,316 | 5/1990 | Heritage et al. | 455/600 |
| 5,035,481 | 7/1991 | Mollenauer | 359/188 |
| 5,117,303 | 5/1992 | Desuruire et al. | 359/179 |
| 5,140,656 | 8/1992 | Hasegawa et al. | 359/173 |

FOREIGN PATENT DOCUMENTS

| | | | |
|---|---|---|---|
| 57-103444 | 6/1982 | Japan | H04B 9/00 |
| 57/115042 | 7/1982 | Japan | H04B 9/00 |
| 63/311309 | 12/1988 | Japan | H04B 9/00 |
| 2147477 | 9/1983 | United Kingdom | H03M 5/16 |
| 2238199 | 5/1991 | United Kingdom | H04B 10/18 |
| 2240683 | 8/1991 | United Kingdom | H04B 10/12 |

OTHER PUBLICATIONS

G. Veith, Self–Phase Modulation In Optical Fibers SPIE vol. 864 Advanced Optoelectronic Technology (1987) R. L. Lemke, A Modem For Miller Coded Digital Data The Australian Computer Journal, vol. 4 No. 1, Feb., 1972.
A. Hadjifortiou And G. A. Hill, Suppression Of Stimulated Brillouin Backscattering By PSK Modulation For High––Power Optical Transmission, IEE Proceedings, vol. 133, PT. J, No. 4, Aug. 1986.
H. J. A. Da Silva, R. S. Fyath And Prof. J. J. O'Reilly, Sensitivity Degradation With Laser Wavelength Chirp For Direct–Detection Optical Receivers, IEE Proceedings, vol. 136, PT. J., No. 4, Aug., 1989.
Henrique J. A. Da Silva And John J. O'Reilly, Modelling And Simulation Of High–Speed Direct Detection Optical Fibre Communication Systems, University Of Wales, Bangor, UK.
Prechirp Technique for Dispersion Compensation for a high––speed long–span Transmission.
Saito et al, IEEE Photonics Tech. letters vo3, No. 1 Jan. 1991 10–Gb/s 360 KM Transmission Over Dispersive.
Fiber Using Midsystem Spectral Inversion. Gnauk et al, 1993 IEEE.

Primary Examiner—Leo Boudreau
Assistant Examiner—Rafael Bacares
Attorney, Agent, or Firm—Baker & Daniels

[57] ABSTRACT

An optical transmission system, particularly useful for long-span, long haul, high data rate applications, The inventive system utilizes pulses with a width of at least 20% of the bit period. Instead of solitary pulses as in soliton systems, the system uses pulses which will eventually interact, but by selection of pulse widths according to bit rate and dispersion of the system the pulse will propagate for large distances. A particular modulation technique is described.

13 Claims, 7 Drawing Sheets

QUASI-SOLITON COMMUNICATION SYSTEM

This is a continuation of application Ser. No. 08/039,016, filed Apr. 7, 1993 now abandoned.

TECHNICAL FIELD

The present invention relates to fibre optic transmission systems, and in particular to systems using optical amplification for long distance transmission at high bit rates.

BACKGROUND ART

A transmission system refers in the present context to a modulation scheme at the transmitter, the spectral and temporal characteristics of the light, the physical path of transmission including the fibre, optical amplifiers, filters isolators and any other components, and the receiver. Although the components can be individually characterised, their response as a system is not a trivial function of the individual characteristics. The over-riding reason for this is the interplay between non-linearity and dispersion effects which become important in long-haul transmission systems. For long distance repeaterless systems, the main constraint on transmission distance is the loss in the system due to the constant attenuation of the fibre, and dispersion due to the chirping of the transmitter. These systems can often be considered as being linear in their response, and the transmission over the optical fibre can be treated as simply adding a certain amount of dispersion, and attenuating by a determined amount.

Semiconductor laser diodes are almost universally used as the transmitter in current and proposed fibre optic communications systems. Most systems employ some form of digital communication whereby the signal which is being transmitted is represented as a sequence of 1's and 0's, independent of nature of the information being transported. The way in which these 1's and 0's are represented in a transmission system depends upon the type of modulation employed.

The most common type of modulation is known as Amplitude Modulation, where the intensity of the light indicates the state of a particular bit of information, high intensity for 1's and low intensity for zeros. This is usually achieved by turning the laster on and off by modulating the current to the laser.

Figure 2:
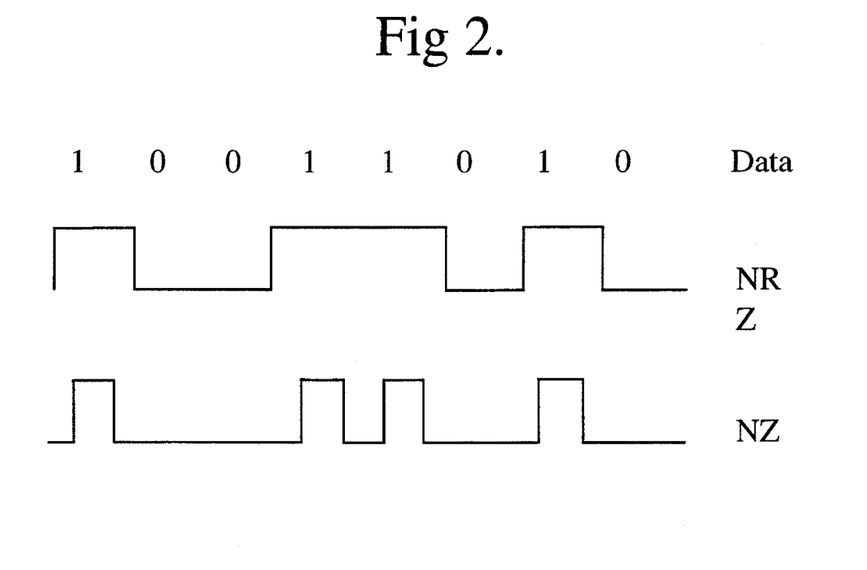
FIG. 2 illustrates the distinction between RZ and NRZ data.

Two formats are used commonly, Return to Zero (RZ), where the laser is turned off after each bit of information, usually for the same length of time that the bit was on, and Non Return to Zero (NRZ), where the intensity is constant for the whole period allocated to the bit and will only change when there is a change from one bit to the next. This is shown in FIG. 2.

One result of amplitude modulation is that the wavelength (and hence frequency) of the light is chirped, i.e. the wavelength of the laser changes during the transmission of the bit because the laser transmission wavelength is a function of the current applied. This effect is detrimental to long distance transmission because optical fibre is dispersive, i.e. different wavelengths travel at slightly different speeds down the fibre. As a result, the light from one bit arrives at the receiver at different times, and so is distorted and can interfere with the other bits. This effect limits the distance that data can travel down an optical fibre, and becomes increasingly important at high bit rates.

An alternative to modulating the current to the laser diode is to apply a constant current to the laser diode, and to externally modulate the light from the laser using a device such as a lithium Niobate crystal modulator. This effectively reduces the chirp, but is difficult to realise because of the high drive voltages required. Additionally, Brillouin scattering can be a problem over long distances because of the large wavelength component at a single frequency.

Figure 3:
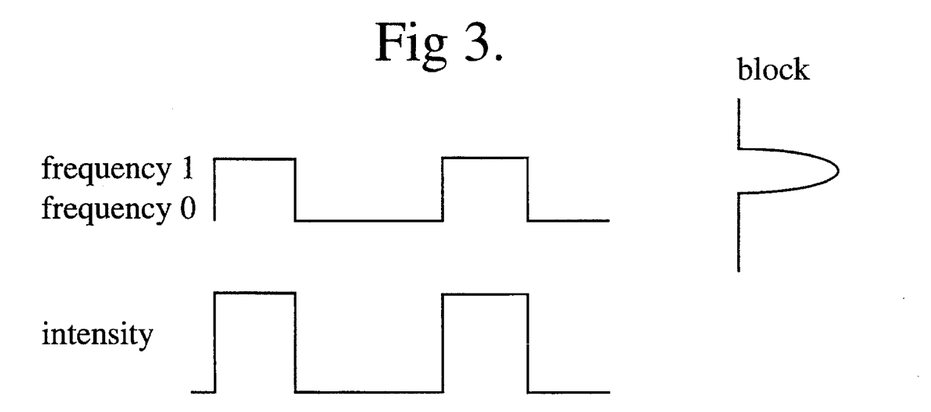
FIG. 3 illustrates modulation by the FSK technique.

Several other schemes have been proposed which are advantageous to long distance transmission, among which are coherent techniques, frequency shift keying (FSK) and soliton transmission. Frequency Shift Keying encodes the bits of information not by on or off, but by transmitting at two different frequency for the ones and the zeros. These rapid changes in the frequency of the light can be achieved by small changes in the current applied to the laser diode. This light can be decoded by filtering the light to only allow one frequency pass. This is shown in FIG. 3. This results in a conversion to amplitude modulation which can be detected in the normal way at the receiver. The filtering can take place either after the transmitter or before the receiver, and the filter can be realised in several different ways, such as Mach-Zender interferometer or a Fabry-Perot filter. As only small changes in frequency are required (dependent upon the bit rate), the wavelength spread is minimal and the effect of dispersion is lessened.

There are many non-linearities present in transmitting optical signals along optical fibres, but of particular concern in the present invention is the Kerr effect. The Kerr effect is that the speed of transmission of light through a fibre is a function of the intensity of the light. Although this is usually only a very small effect, at sufficiently high intensities and over long enough distances the net effect can be quite dramatic, including extreme pulse narrowing and chaotic behaviour.

One known technique which utilises non-linearity to overcome the effects of dispersion is soliton systems. Solitons, or solitary waves are pulses of a mathematically defined shape (solutions of the non-linear Schrodinger Equation) which can travel along a dispersive non-linear medium without change of shape. At a particular intensity, the pulse narrowing effect of the non-linearity exactly cancels the pulse broadening effect of the dispersion and the pulse propagates undisturbed indefinitely. Generally, each soliton represents a 1 in the data stream and absence of a soliton indicates a zero.

Soliton propagation, however, requires both constant intensity of the light, and that the pulses be solitary. To achieve the latter the pulses must be separated from each other by a distance much larger than the width of each individual pulse. This requirement results from the non-linear interaction which occurs between pulses that are too close leading to chaotic behaviour. Indeed, by definition, solitons must be propagated in a solitary way.

Various researchers have investigated soliton transmission systems of the type described, for instance Mollenauer et al, IEEE Journal of Quantum Electronics, Vol QE-22, No. 1, January 1986 p 157–173. Kubota and Nakazawa, IEEE Journal of Quantum Electronics, Vol 26, No. 4, April 1990 discuss a variety of soliton propagation called pre-emphasis wherein the input power of the soliton is increased.

The various papers in the literature provide, in summary, the following rules for soliton propagation:

i/ the intensity of the pulse should not deviate by more than 4 dB from the mean intensity; and ii/ the pulses should be separated by a distance such that the pulses are non-interacting. This in general requires a separation of at least 7 to 10 times the width of the pulse.

In soliton propagation, when the intensity of the pulse is reduced, the pulse broadens to maintain the relationship between intensity and width which is characteristic of a soliton. On the other hand, an increase in intensity narrows the pulse until the characteristic soliton relationship between width and intensity is regained. This narrowing and broadening of the pulses adds to the interaction with neighbouring pulses and so this imposes the constraint on the intensity deviation and the pulse separation. In practical terms these limitations mean that the amplifier spacing is limited to distances over which a soliton will decay by about 8 dB in practical systems. Solitons are introduced at a higher intensity and decay to a lower intensity than the required average intensity.

OBJECTS OF INVENTION

It is an object of this invention to provide a long distance transmission system which utilises non-linearity to overcome dispersion, but which is not limited to short span lengths between amplifiers.

DISCLOSURE OF INVENTION

The proposed transmission system involves the transmission of near-transform limited pulses.

The invention is based on the discovery that by specifying the pulse width and bit rate of an optical transmission system, in such a way that the rules of soliton transmission are simultaneously violated, then by controlling the intensity throughout the system by controlling the optical amplification, the system length can be extended by a large factor over the dispersion limit for a comparable linear system. The system according to the invention also allows for an large increase in span length compared to a soliton system. The pulses no longer propagate as solitons, as even at constant intensity they will eventually interact with each other, but by choosing the pulse widths according to the bit rate and dispersion of the system they can be made to propagate for thousands of kilometers.

BRIEF DESCRIPTION OF DRAWINGS

The invention will be further illustrated with reference to the accompanying drawings, in which.

DESCRIPTION OF EMBODIMENT

Figure 1:
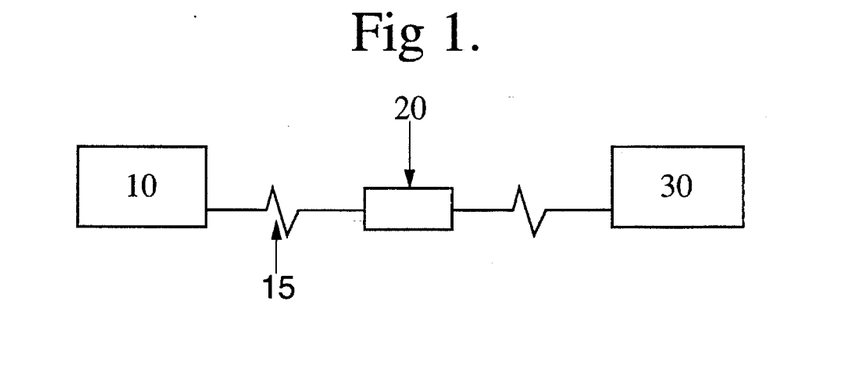
FIG. 1 illustrates in block form a system according to one aspect of the present invention.

FIG. 1 illustrates a very simple example of the type of system contemplated, comprising transmitter 10, transmission fibre 15 and optical amplifier 20, terminating in receiver 30. It will be understood that many amplifiers 20, and accordingly many fibre spans, may be present as required in the actual implementation.

The system comprises a transmitter 10 which is able to produce a data train of near-transform limited pulses of the desired width and bit rate. The specifications for these are an integral part of the system.

The invention is theoretically based upon the solutions of the non-linear Schrödinger equation for the complex electric field envelope $E(z,t)$:

$$\frac{i \partial \psi}{\partial \xi} = \frac{-k''}{2} \frac{\partial^2 \psi}{\partial \tau^2} + |\psi|^{2|\psi|} + i\alpha \psi$$

where $E(z,t) = E(z,t)\exp(i\omega_0 t - ikz)$, $$\psi(z,t) = \frac{E_{(z,t)}}{E_0} \quad (i)$$

$$\xi = \frac{z}{Z_d}$$

$$\tau = \frac{t - z/v}{t_0} \quad (ii)$$

$$v = \left(\frac{\partial \omega}{\partial \kappa}\right)_{\omega_0}$$

$$Z_d = \frac{t_0^2}{k''}$$

$$E_o^2 = \frac{\lambda}{\pi n_z t_0^2} k'' \quad (iii)$$

where t is time, z is the coordinate along the fibre axis, $\omega_0$ is the carrier frequency, $\alpha$ is the loss coefficient, $t_0$ is a characteristic time of the problem, $n_z$ is the non-linear refractive index and k" is the dispersion.

The important point is that the characteristic length $Z_d$ of the equation is not uniquely determined and can be chosen arbitrarily by appropriate choices of the characteristic time and power of the equation. In other words, one solution of the non-linear Schrödinger equation can have a whole series of physical interpretations, where only the time and length scans change according to (i) and (ii). The systems with which the present invention is concerned are ones in which the characteristic length is large compared to the span length. This ensures the pulses no longer react adiabatically, or in other words, that their shape is determined by an average power instead of the instantaneous power, ensuring the pulses do not expand and contract too much with the attenuation and gain along a fibre.

Choosing the characteristic length therefore dictates the time and power scales for a given dispersion through (ii) and (iii). The bit rate thus appears limited to about 1 Gbit/s over standard fibre, and about 10 Gbit/s over dispersion shifted fibre, where the fibre has an average dispersion of −2 ps/nm.km, for transoceanic distances. For distances of a few thousand kilometers, 2.5 Gbit/s transmission should be possible using standard fibre. This could be particularly useful in applications such as low cost island hopping systems, and certain terrestrial applications.

In the preferred system according to the present invention, the following design rules are put in place of the soliton transmission rules:

i/ The pulse width is greater than 20% of the bit period.

ii/ The dispersion of the system must be such that over any one span the broadening of the pulse width due to dispersion in the linear regime is a small fraction (less than about 10%) of the pulse width. The greater the total system length, the smaller the allowable dispersion in each span.

iii/ The intensity at the beginning of each span is chosen to be larger than the corresponding 'soliton' intensity by a factor such that the non-linear compression counteracts the dispersion over that span.

Condition (ii) is made possible at reasonably high bit rates because of the trade off involved in the first condition. By choosing a pulse width which is wider by a factor of 4 (say) for a given bit rate, the frequency bandwidth is reduced by a factor of 4, and hence the dispersion is reduced by a factor of 4. As a fraction of the pulse size, this is now 1/16th the relative size for a fibre of a given dispersion. The following example illustrates the advantages of this approach:

Assume fibre dispersion=2 ps/GHz for 100 km

Bit rate=5 Gbit/s/s

|  | Soliton | Invention |
| --- | --- | --- |
| bit period (ps): | 200 | 200 |
| pulse width (ps): | 20 | 75 |
| bandwidth (GHz): | 15 | 4 |
| dispersion (ps): | 30 | 8 |
| broadened pulse (ps): | 36 ps | 75 ps |
| broadening ratio: | about 80 | <1% |

In the present invention, instead of trying to compensate for dispersion at every point along the fibre, sections of predominant non-linearity straight occur after the amplifier and the much longer lengths of dispersion further away. Because the inventive arrangement will generally use longer pulses, the bandwidth of the pulse is reduced and the pulse disperses very little relatively over this distance as illustrated by the above example. The choice of the transmission intensity is straightforward once the fibre's non-linearity and modesize is known. The correct levels have been established by numerical simulation, but can easily be determined experimentally by one skilled in the art. Long transmission spans lengths up to 150 km appear possible, at which point noise and other considerations dominate.

It is noted that an alternative implementation may use dark pulses travelling in the normal dispersion regime of a fibre, rather than the anomalous regime (this relates to the sign of k"). A dark pulse is the absence of a "pulse" on a constant higher intensity background, rather than a signal against a low or zero intensity background. These dark pulses may also be generated using the modulation technique described below, substituting a filter to exclude the transition frequencies.

It is emphasised that the present invention is not to be considered limited to any one modulation system—the essence of the invention is the general scheme, not the specific components.

Figure 7:
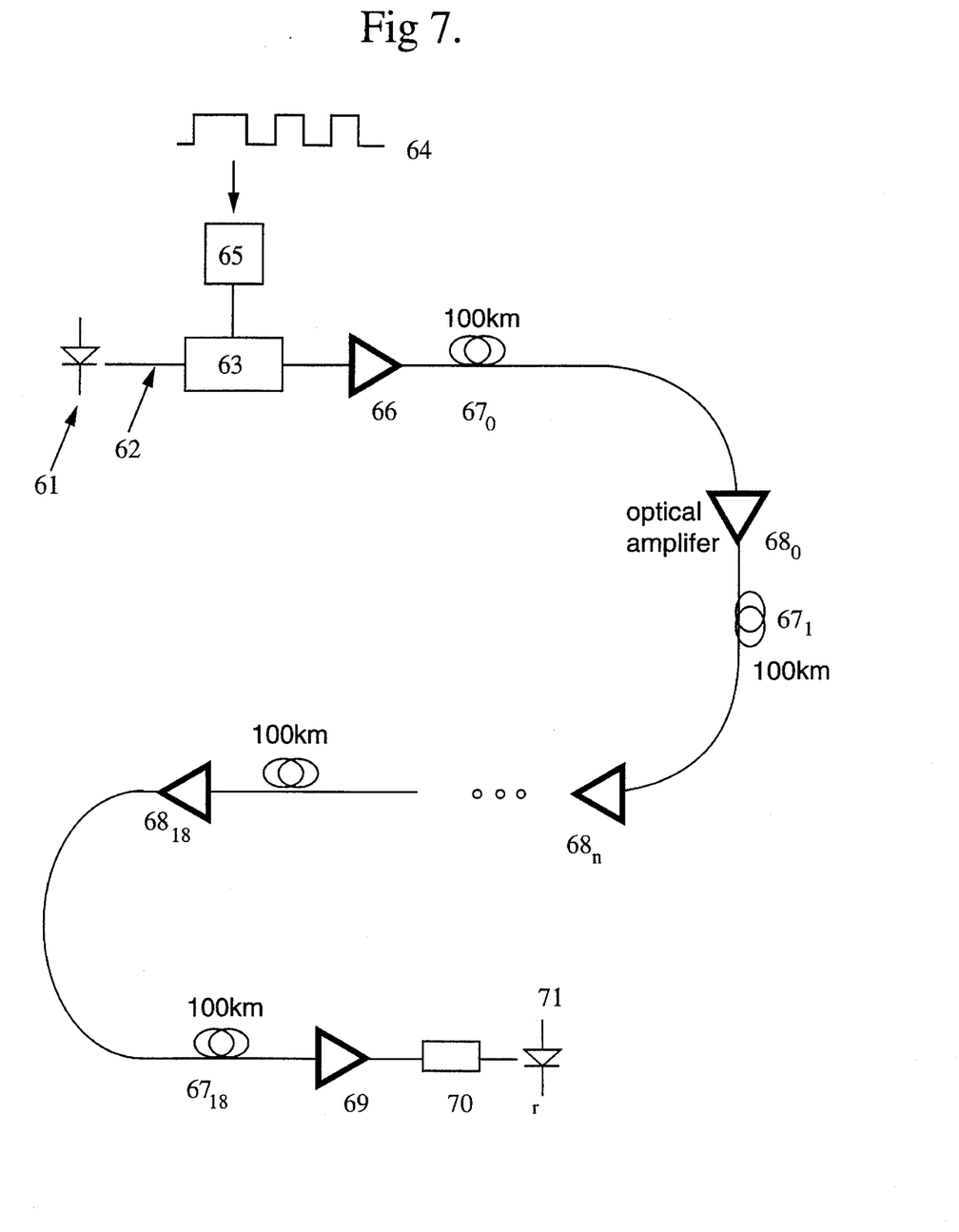
FIG. 7 illustrates schematically an example of the operation of a system according to the invention.

Referring to FIG. 7, this is an example of one specific implementation of the inventive transmission system. In this implementation non-dispersion shifted (standard telecommunications single mode) fibre is used and the signal is transmitted at 1550 nm, where the chromatic dispersion of the fibre is high (15 ps/nm.km), but the loss is a minimum (0.16–0.18 dB/km). The advantages of this system will be highlighted by comparison with a soliton based system, and with a non return-to-zero (NRZ) system.

According to the system of FIG. 7, a distributed feed back (DFB) laser 61 is adequate to use as the single mode high coherence light source. The DFB 61 is biased with a constant current above threshold, and lases at a wavelength near the peak of the gain spectrum of the amplifiers in the system, say 1535 nm for an erbium-doped fibre amplifier. The output of the DFB 61 is coupled into a single mode fibre 62 and passed through a fibre pigtailed Lithium Niobate, Mach-Zender external modulator 63. The data 64 at a bit rate of 2.5 GBit/sec is used to modulate the External modulator 63 in such a way that a pulse of 141 ps temporal duration (full-width half-maximum) is generated for each bit of information. This is achieved by first generating an appropriate electrical pulse train via pulse generator 65 or by the use of other methods as described below (i.e. using The transition of a square wave to generate the pulse). In this example we have used sech squared intensity shape for the pulses. It will be appreciated that while sech squared is a preferred shape, it is not essential to the invention and any suitable pulse shape may be used in practice. Each pulse has an electric field vector opposite to the preceding pulse, to ensure that in spite of pulse overlap there is a zero intensity region between the pulse where the electric fields are equal in magnitude but opposite in sign. Having the pulses with alternating sign produces a pushing apart of pulses upon non-linear propagation. If they were in phase, there would be a pulling between pulses, in a similar fashion to that encountered in soliton propagation. Either the pushing or pulling regime may be used, but the former is used for the purposes of this example.

The resulting optical pulse train is then amplified by the booster amplifier 66 to the correct power level before being transmitted along the first span of fibre $67_0$. In this numerical model the power level corresponds to a peak pulse power of 3.8 mW, and hence an average power of less than 1 mW. The first booster amplifier $66_0$ and subsequent in line amplifiers $66_n$ are chosen for this example to be Erbium-doped fibre amplifiers with the length chosen to give maximum gain at the signal wavelength of 1535 nm. The required output powers are easily achieved with diode pumped erbium amplifiers.

In reality this example may underestimate the power required slightly and so the power chosen in practice should be determined exactly for the fibre characteristics used in order to as nearly as possible replicate the original pulse train after one span and amplification period, as will be understood by those skilled in the art.

The span length we have chosen is 100 km of standard telecommunications fibre or pure silica core fibre when an absolute reduction in losses is required. In cases where noise considerations become dominant it may be necessary to decrease this length slightly, but for total system lengths of 2000 km this span length is feasible. In this example we have shown 19 in line amplifiers $68_0$–$68_{18}$ have been used, and at each amplifier the signal power is maintained at the correct value to achieve minimal pulse broadening or distortion. In general each of the amplifiers $68_n$ will have identical output power, though some slow transition to high powers at the end of the span to overcome noise floor limitations may be imposed. At the end of the system the signal is regenerated by a combination of a erbium preamplifier 69, an optical filter 70 and a receiver 71 (a pin photodiode for example).

Figure 8:
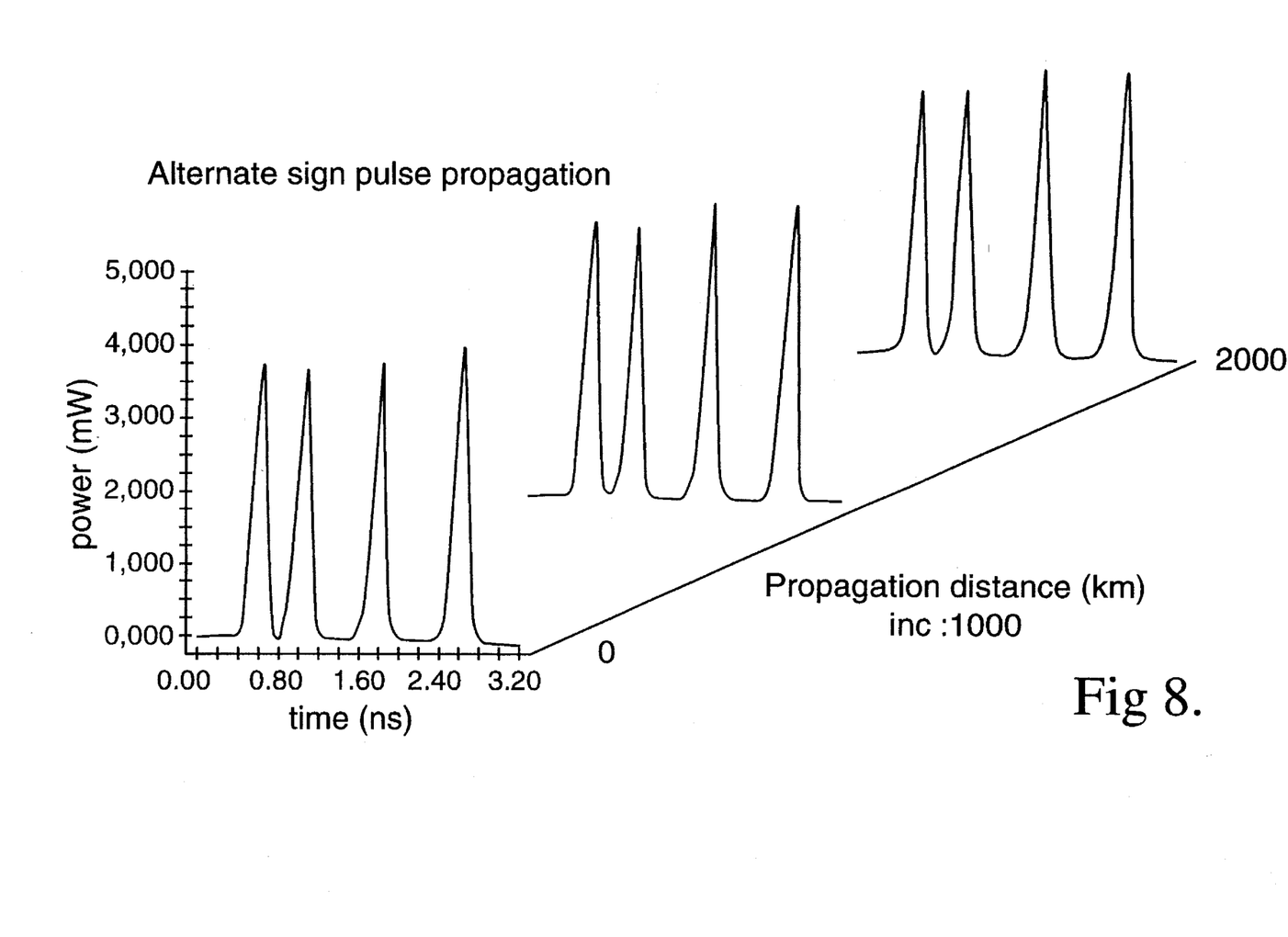
FIGS. 8, 9 and 10 show the same digital signal as transmitted and as received over 1000 and 2000 km of the system of FIG. 7 for the preferred embodiment, a short pulse system and a conventional NRZ system respectively.
Figure 9:
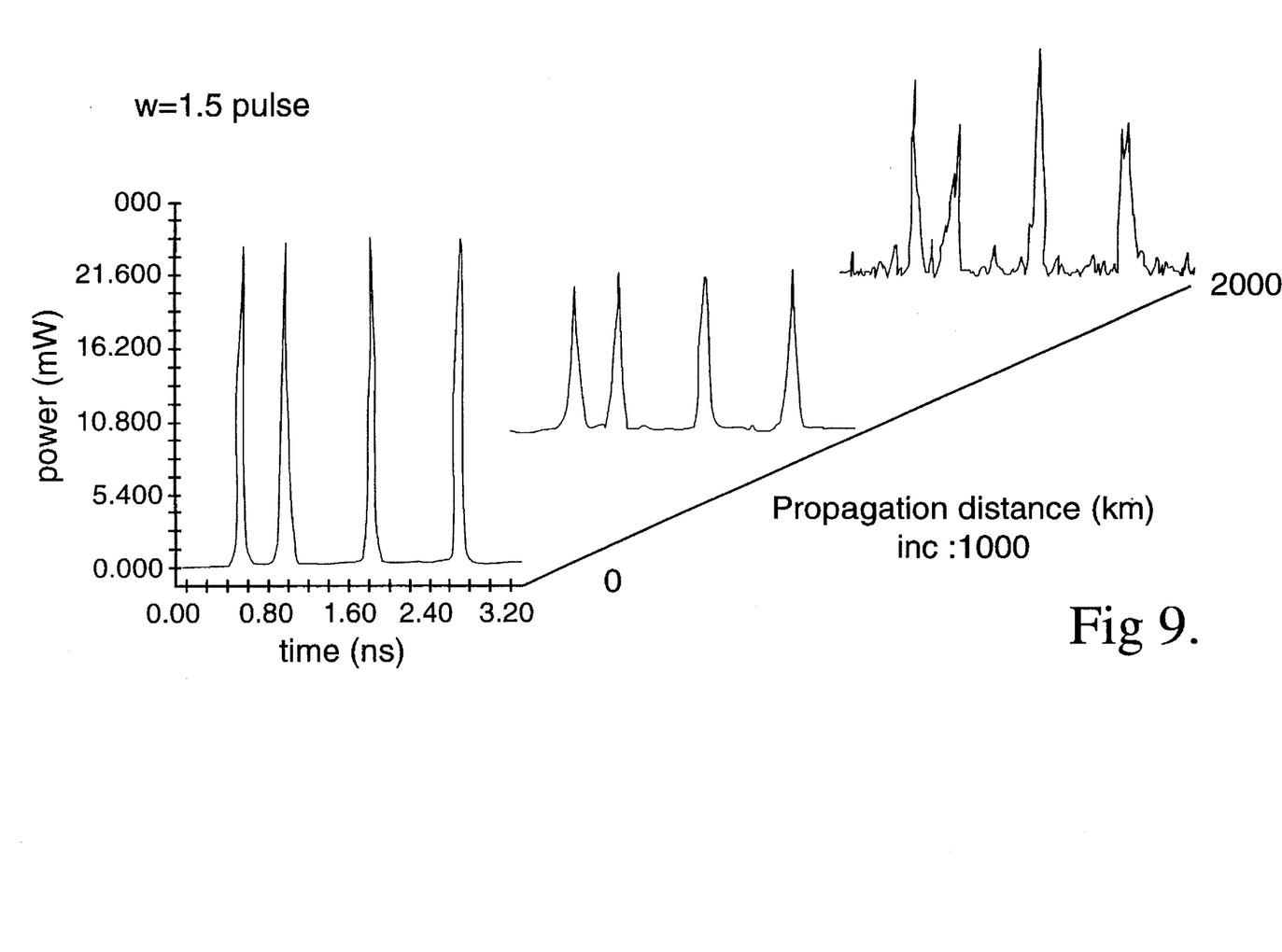
Figure 10:
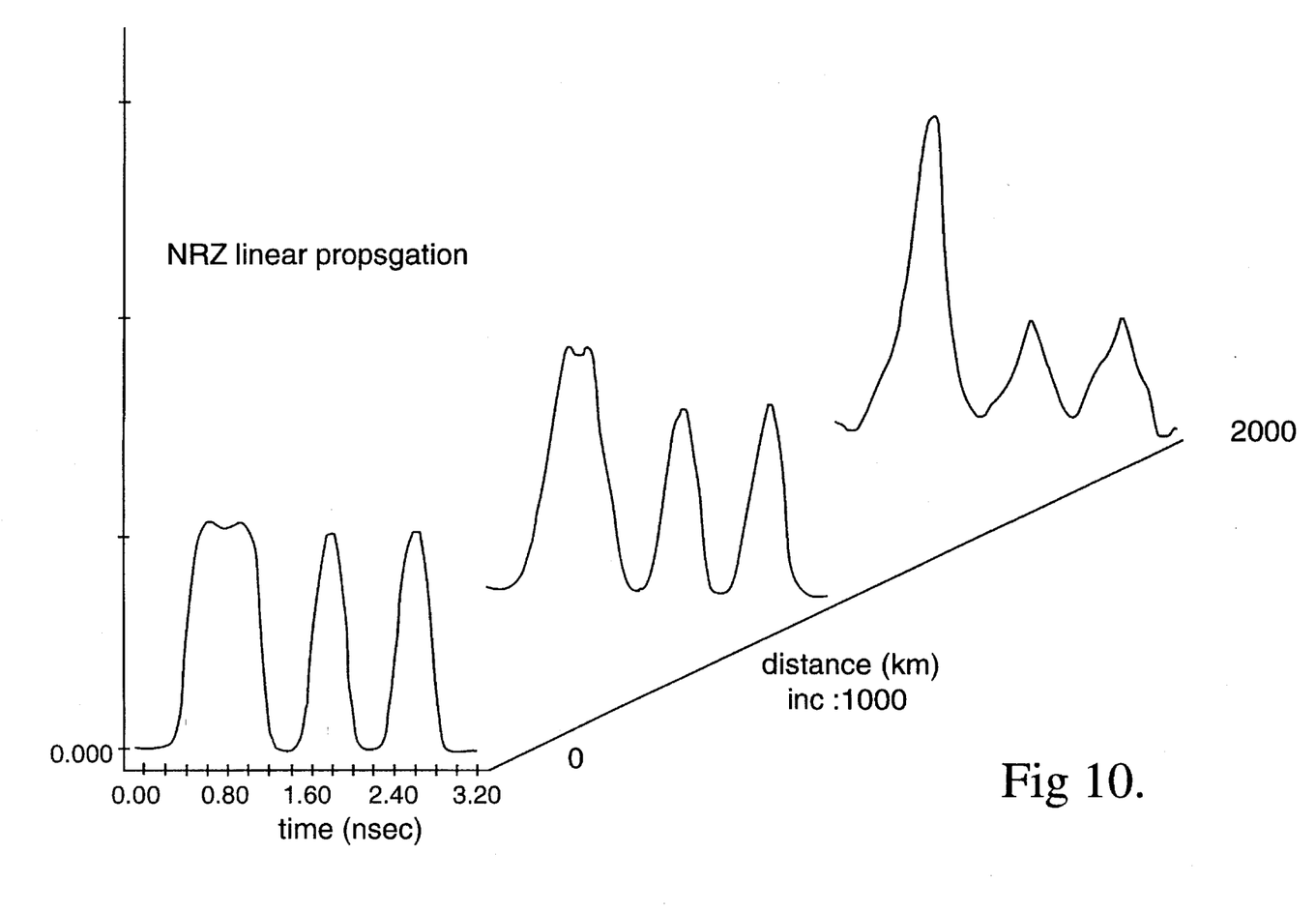

This example has been simulated numerically to demonstrate the advantages that this system offers over both a conventional NRZ transmission system, and a soliton system. In FIG. 8 it is apparent that propagation of the 141 ps pulses encoding a 0,1,1,0,1,0,1,0 eight bit pattern over 2000 km with 100 km span lengths has resulted in very little pulse degradation and only minimal pulse interaction. There is some slight pulse pushing evident between the neighbouring bits, but not sufficient to induce a significant penalty. When shorter pulses are propagated, in this case 54 ps pulses which approach pulse widths in the soliton propagation regime, shown in FIG. 9, it is not possible to chose a power level that gives acceptable pulse propagation over 2000 km. For even shorter pulses the situation becomes rapidly worse. This is because a soliton is not able to tolerate large variations in the average power due to the large span length. The conventional NRZ system is dispersion limited at this length and very low powers, as is apparent from FIG. 10. At higher powers both dispersion and non-linearity degrade the received data over these distances.

It can therefore be seen from the example that the proposed system suffers the least degradation over the spans and distance illustrated compared with conventional NRZ and soliton systems.

Further, the system described in the example can employ non-dispersion shifted fibre and large repeater spacings over distances of several thousand kilometers. This provides a clear cost advantage over systems requiring specialised fibre. In particular, soliton systems generally require amplifier spacings at least every 40 km, creating additional reliability and cost burdens on the system simply because more amplifiers are required.

A conventional NRZ system over the distance proposed in the example would require dispersion shifted fibre, with the dispersion minimum shifted to nearly the signal wavelength of 1.55 μm. The design of such a system is complex, to ensure the average dispersion requirements are met. Further, the cost of the fibre, higher losses associated with the fibre and hence need for more repeaters again necessitate a more complex (and hence less reliable) and more costly system.

According to the present system, the exact average dispersion requires less rigid tolerances, so that it is easier to operate at any wavelength in the given region. By placing the signal wavelength at the peak of the gain spectrum, filtering is minimised or avoided and multiple wavelength transmission, i.e. wavelength division multiplexing, may be used to upgrade the system to higher bit rates.

A specific modulation technique for semiconductor lasers suitable for producing pulses according to the present invention is described below.

It can be advantageous to transmit pulses of light for each bit of information where a pulse represents a one and no pulse represents a zero. Techniques for this include gain switching which involves applying an electrical pulse to the laser, and mode-locking, which involves applying gain at a constant repetition rate related to the time for the pulse to travel around a resonant cavity formed by a loop or a mirror. Both methods have serious draw backs and so have not been used widely in systems. The first method results in large chirping and consequent dispersion problems, and the second method requires that the pulse stream be externally modulated to remove the zeros and can only be used at discrete repetition rates.

It is therefore desirable to provide a system able to generate a pulsed stream of data suitable for implementation in the transmission system described above, with minimal chirp at high bit rates, requiring only small drive voltages and no external modulation.

Figure 4:
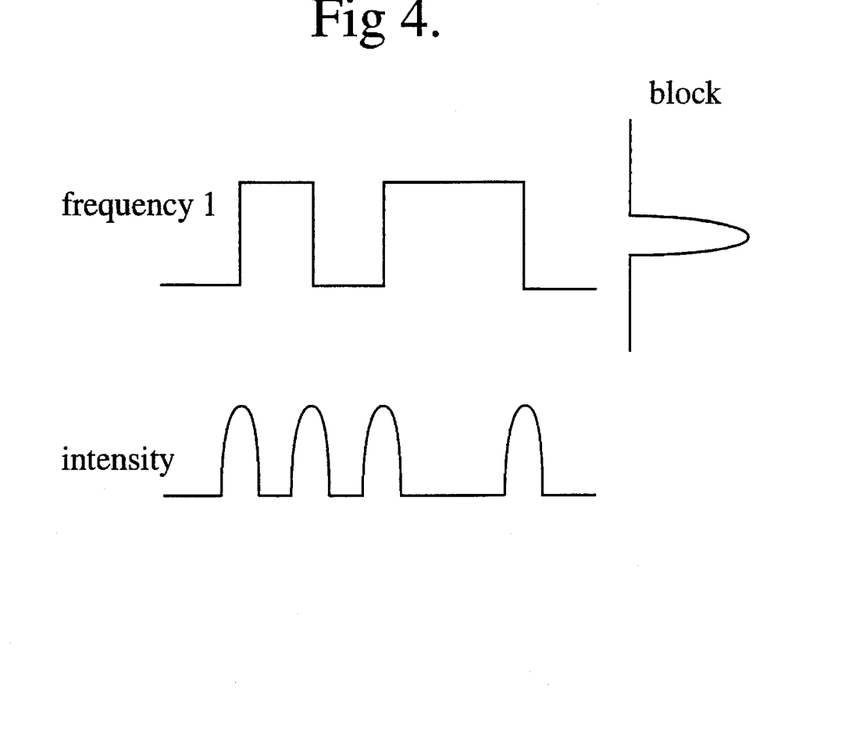
FIG. 4 illustrates one form of modulation suitable for providing pulses according to the present invention.

The present invention may be implemented using a modulation system which takes an electrical NRZ data stream and converts it to an optical pulsed data stream with very low chirp. The idea is to generate a pulse every time there is a transition in an NRZ signal, from 1 to 0 or from 0 to 1. The electrical NRZ is used to frequency shift the laser diode in a similar fashion to FSK. A filter is then used to pass the frequencies not of the 1's or 0's but the intermediate frequencies, corresponding to the transition. As such light will only pass during the transition from a one to a zero, in the form of a short pulse of light at each transition. This is illustrated in FIG. 4. This system will be described hereinafter as PTFSK (Pulsed Transition Frequency Shift Keying).

The filter pass band will generally be smaller than that required for FSK, and is chosen according to the width of the pulse required and the rise and fall times of the driving current. The filter is capable of being less sensitive to non ideal frequency modulation response of a laser because it acts on a transition which can be made as sharp as required by increasing the frequency difference between the two levels. A properly chosen filter will give a transform limited pulse, i.e. the minimal range of wavelengths which is theoretically possible, and accordingly pulses suitable according to the present invention.

Figure 5:
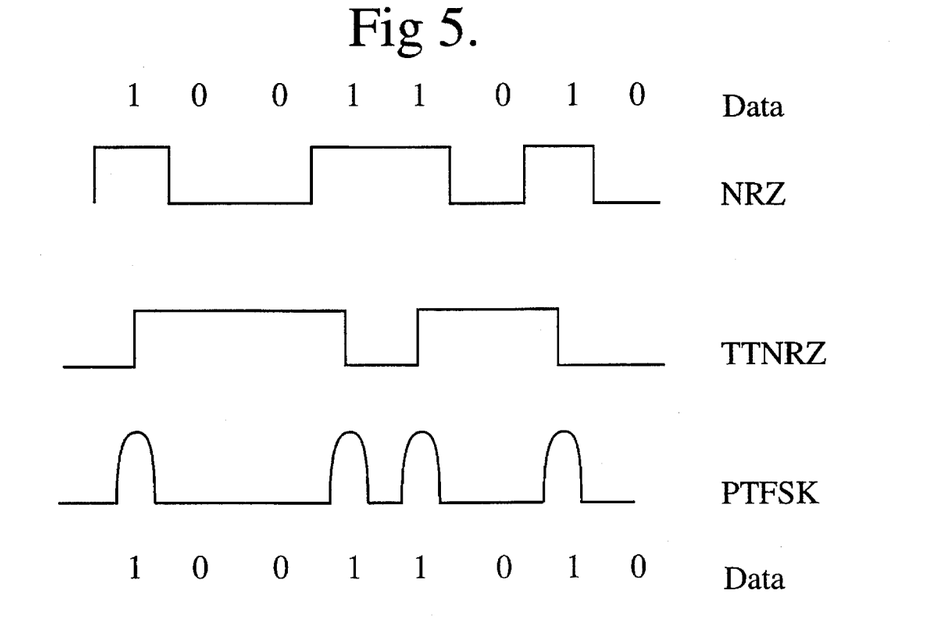
FIG. 5 further illustrates the waveforms present for sample data at various stages in the modulation technique.

The pulsed data stream achieved is not equivalent to the original data stream so it is necessary to decode the data either at the transmitter or the receiver. One way of implementing this is to construct from the original data at the transmitter a second NRZ data stream which will produce the correct pulse stream. This derived NRZ data involves generating a transition or a flip from one electrical level to another every time a one passes. This is illustrated in FIG. 5. This can be implemented with straightforward electronic logic as will be apparent to those skilled in the art.

Figure 6:
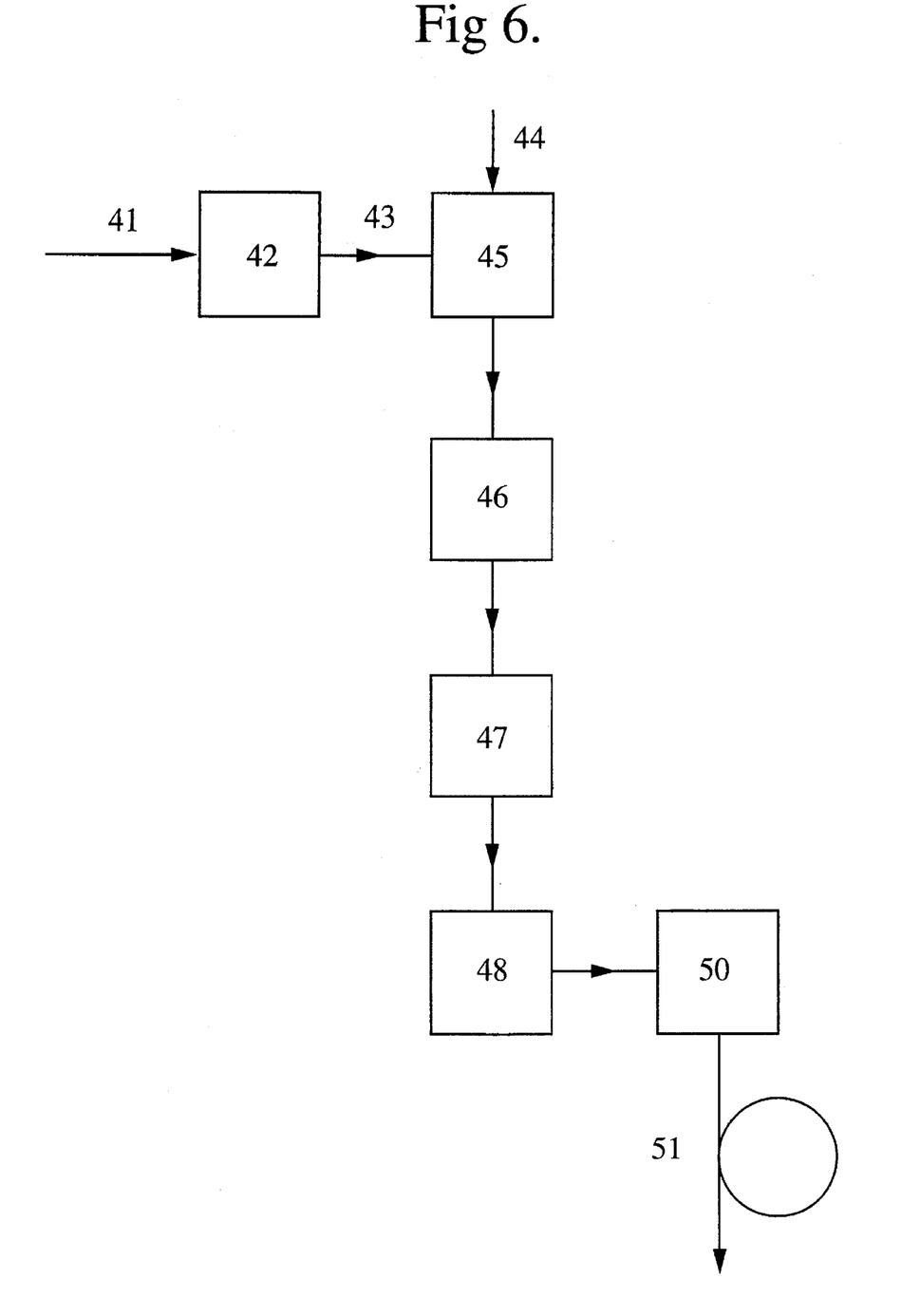
FIG. 6 illustrates schematically in block form one system for generating pulses suitable for use with the present invention.

The preferred implementation of PTFSK (FIG. 6) consists of an electrical converter stage 42 which converts a NRZ or RZ electrical signal 41 to what we can term the transition triggering NRZ (TTNRZ) signal 43. A bias current 44 and the TTNRZ current 43 can be combined together in the usual fashion employing a bias Tee 45. This current signal is then applied to a Distributed Feed Back (DFB) laser 46, with the bias set well above threshold. The optical output 47 is then filtered using a Fabry-Perot filter (or similar) 48 at a frequency midway between the frequency of the 1's and 0's. The pass band of the filter is chosen to exclude the two frequencies for one and zero, but to allow a range of transition frequencies to pass. The output is then a PTFSK signal 49. Both the bias current to the laser and the pass band of the filter may need to be stabilised in a feed back loop to ensure that the filter picks out only transition frequencies. An optical amplifier 50 may be used to amplify the system to a sufficient output power for transmission through fibre 51, and to compensate for the losses through the filter.

PTFSK may be implemented using other hardware, for instance using external modulation of a CW laser. In this case the drive voltage to the modulator corresponds to an off or both the one and the zero bits. These two voltages can be chosen so that there is an 'on' state in between them. As such the light will only pass when there is a transition between a one and a zero. The width and amplitude of the pulse depend upon the rise and fall time of the driving voltage. The rest of the implementation would remain substantially unaltered.

The reader will appreciate that the examples provided are not limitative of the broad invention disclosed therein, and that variations and additions thereto are possible within the scope of the present invention.

The claims defining the invention are as follows:

1. In a high speed optical transmission system comprising transmitter means, receiver means and a plurality of lengths of spans of optical fibre separated by optical amplifiers, an improvement wherein said transmitter means generates non-soliton optical pulses having a width of at least 20% of the bit period, each of said lengths of spans causing said optical pulses to be dispersed in a manner that the broadening of each pulse due to dispersion in the linear regime over any of said lengths of spans is less than about 10% of the pulse width.

2. A system according to claim 1 wherein the gain of each amplifier is selected such that the intensity of the pulses at the beginning of each span is chosen such that the non-linear compression of each pulse will substantially compensate for the dispersion over each span.

3. A system according to claim 1, wherein the electric field vector of each optical pulse generated by said transmitter means has a phase relationship with neighbouring pulses such that interactions with neighbouring pulses are minimised.

4. A system according to claim 3, wherein the electric field vector of each optical pulse generated by said transmitter means is opposite in phase to the preceding pulse.

5. A system according to claim 1, wherein the polarisation of each optical pulse generated by said transmitter means is controlled such that interactions with neighbouring pulses are minimised.

6. A system according to claim 1, wherein said transmitter means generate modulated optical pulses by the steps of:

(i) receiving an NRZ data input;

(ii) electrically processing said data input to produce a corresponding data steam which has transitions from the 0 to 1 state or 1 to 0 data only for a given state of the NRZ data input; and (iii) modulating an optical pulse generator using said corresponding data stream.

7. A system according to claim 6 wherein said optical pulse generator comprise a diode laser with a bias current set above threshold, the corresponding data stream having a current such that a distinct frequency is produced according to said data having a 1 or 0 state, and wherein said laser output is filtered such that only pulses corresponding to 1 to 0 or 0 to 1 transitions are transmitted.

8. A system according to claim 2, wherein the electric field vector of each optical pulse generated by said transmitter means has a phase relationship with neighboring pulses such that interactions with neighboring pulses are minimized.

9. A system according to claim 2, wherein the polarization of each optical pulse generated by said transmitter means is controlled such that interactions with neighboring pulses are minimized.

10. A system according to claim 3, wherein the polarization of each optical pulse generated by said transmitter means is controlled such that interactions with neighboring pulses are minimized.

11. A system according to claim 4, wherein the polarization of each optical pulse generated by said transmitter means is controlled such that interactions with neighboring pulses are minimized.

12. The system of claim 1 wherein the dispersion rating associated with said lengths of spans of fibre causes said non-soliton optical pulses to be dispersed in a manner that the broadening of each pulse due to dispersion in the linear regime over any of said lengths of spans is less than about 10% of the pulse width.

13. The system of claim 1 wherein the non-soliton optical pulse width conjunction with each of said lengths of spans causes said optical pulses to be dispersed in a manner that the broadening of each pulse due to dispersion in the linear regime over any of said lengths of spans is less than about 10% of said pulse width.

* * * * *